United States Patent [19]
Ogata

[11] Patent Number: 5,640,276
[45] Date of Patent: Jun. 17, 1997

[54] FOUR-UNIT ZOOM LENS SYSTEM HAVING A HIGH ZOOM RATIO

[75] Inventor: Yasuji Ogata, Akikawa, Japan

[73] Assignee: Olympus Optical Co., Ltd., Tokyo, Japan

[21] Appl. No.: 289,665

[22] Filed: Aug. 12, 1994

[30] Foreign Application Priority Data

Sep. 3, 1993 [JP] Japan .................. 5-220028

[51] Int. Cl.$^6$ .................................................. G02B 15/14
[52] U.S. Cl. ........................................... 359/686; 359/683
[58] Field of Search .............................. 359/683, 686, 359/772

[56] References Cited

U.S. PATENT DOCUMENTS

| 5,189,557 | 2/1993 | Endo | 359/683 |
| 5,303,086 | 4/1994 | Mori | 359/683 |

FOREIGN PATENT DOCUMENTS

| 63-43115 | 2/1988 | Japan . | |
| 2135312 | 5/1990 | Japan . | |
| 2201410 | 8/1990 | Japan . | |
| 2223908 | 9/1990 | Japan . | |
| 3-85508A | 4/1991 | Japan | 359/686 |

Primary Examiner—Georgia Y. Epps
Assistant Examiner—Michael A. Papalas
Attorney, Agent, or Firm—Cushman, Darby & Cushman

[57] ABSTRACT

The invention provides a four-unit type of zoom lens system which is of compact size albeit having a high zoom ratio, and comprises a first unit G1 of positive refracting power, a second unit G2 of positive refracting power, a third unit G3 of negative refracting power, and a fourth unit G4 of negative refracting power, wherein the spaces between the units vary during zooming, said zoom lens system being characterized in that all these units are moved toward the object side for zooming from the wide-angle to telephoto end.

39 Claims, 13 Drawing Sheets

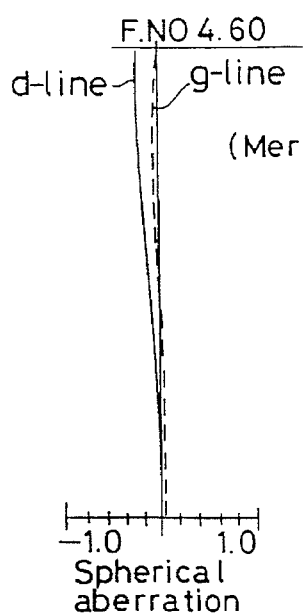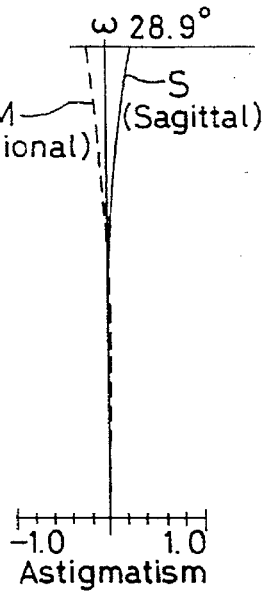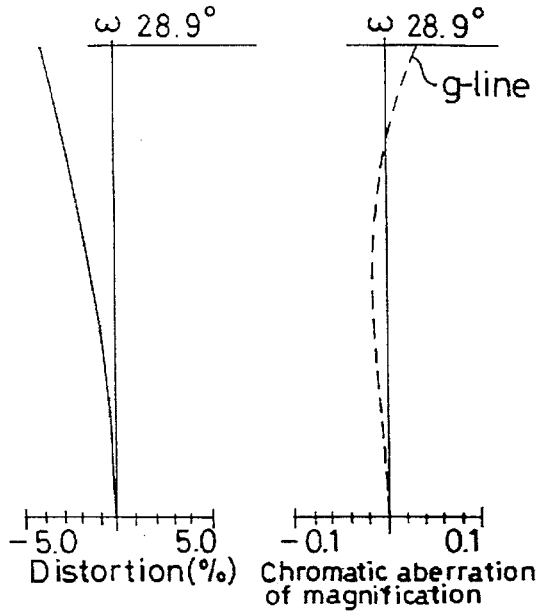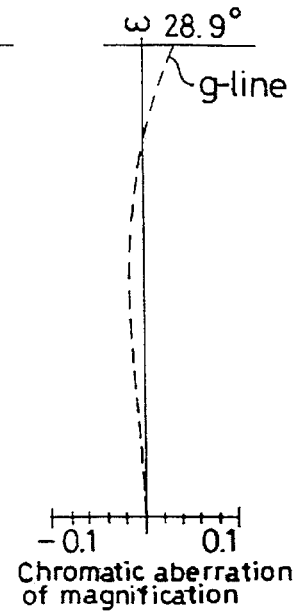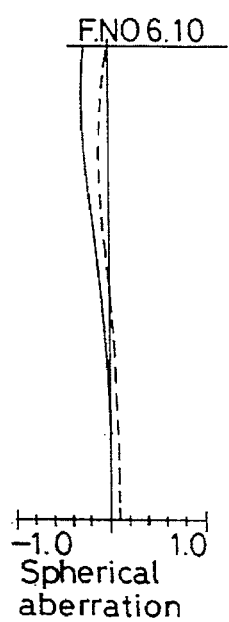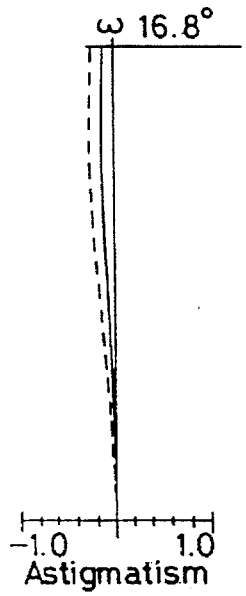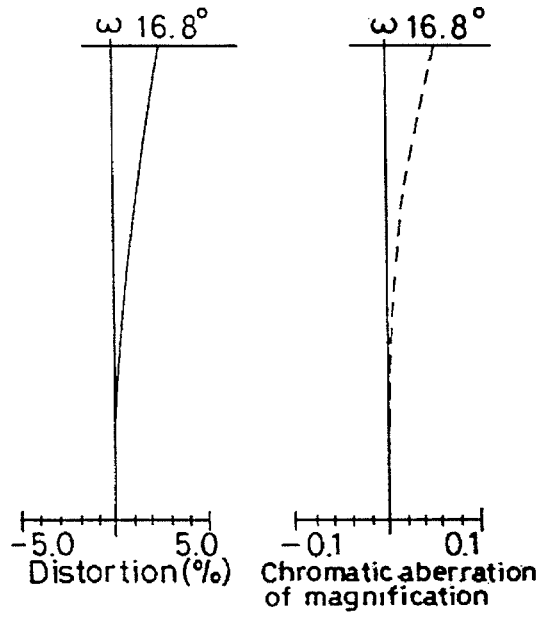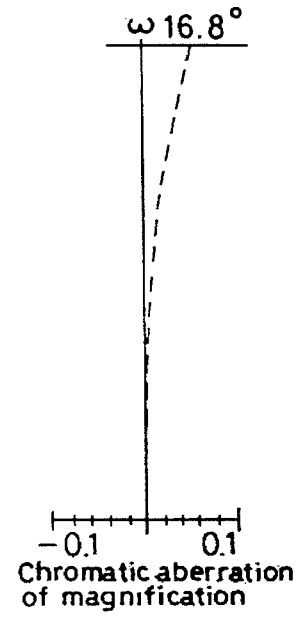

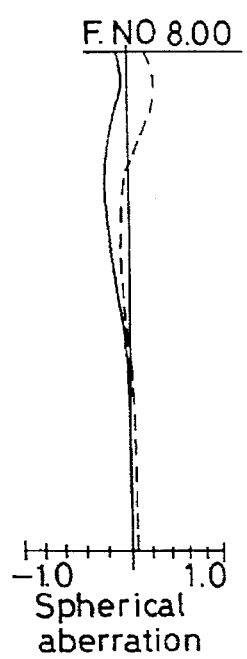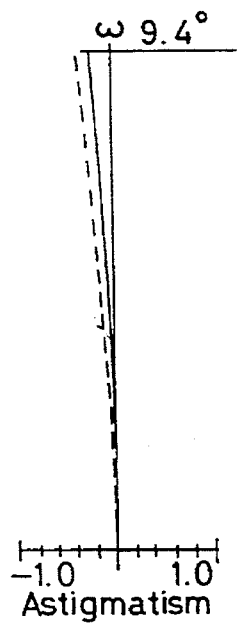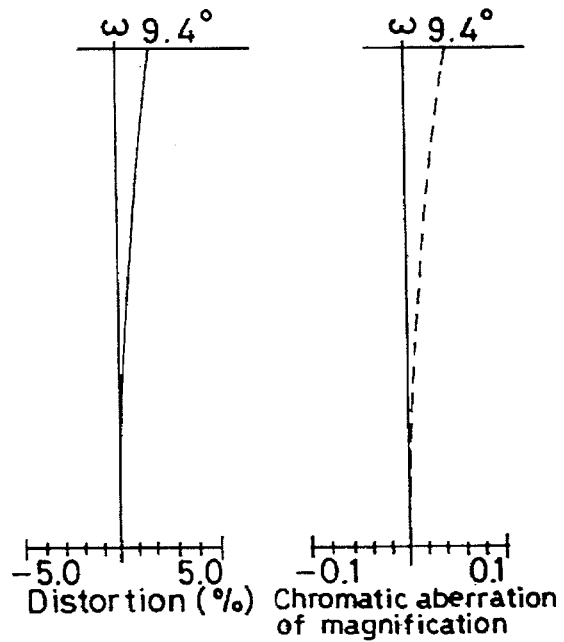

F.NO 4.00

-1.0  1.0
Spherical
aberration

ω 28.9°

-1.0  1.0
Astigmatism

ω 28.9°

-5.0  5.0
Distortion (%)

ω 28.9°

-0.1  0.1
Chromatic aberration
of magnification

F.NO 6.10

-1.0  1.0
Spherical
aberration

ω 16.0°

-1.0  1.0
Astigmatism

ω 16.0°

-5.0  5.0
Distortion (%)

ω 16.0°

-0.1  0.1
Chromatic aberration
of magnification

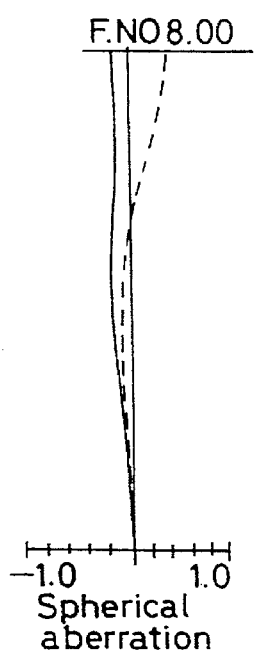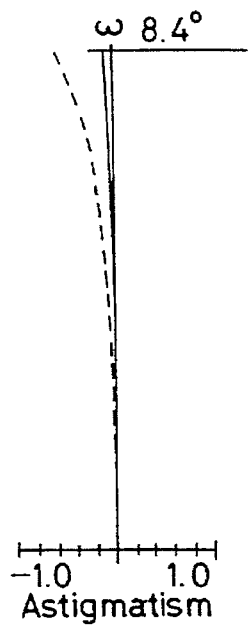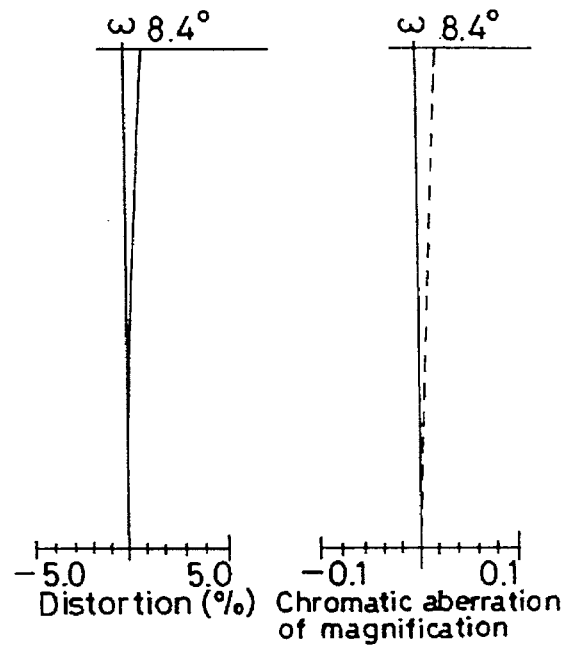

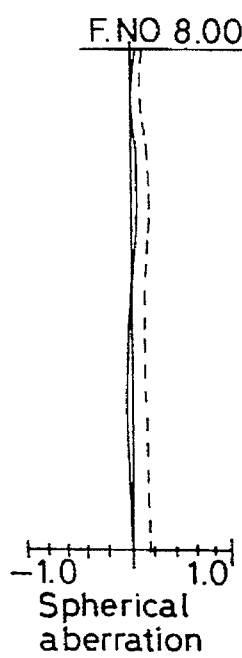
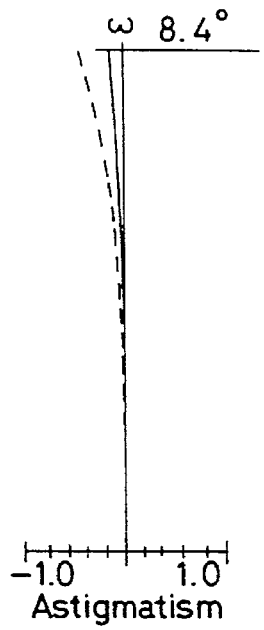
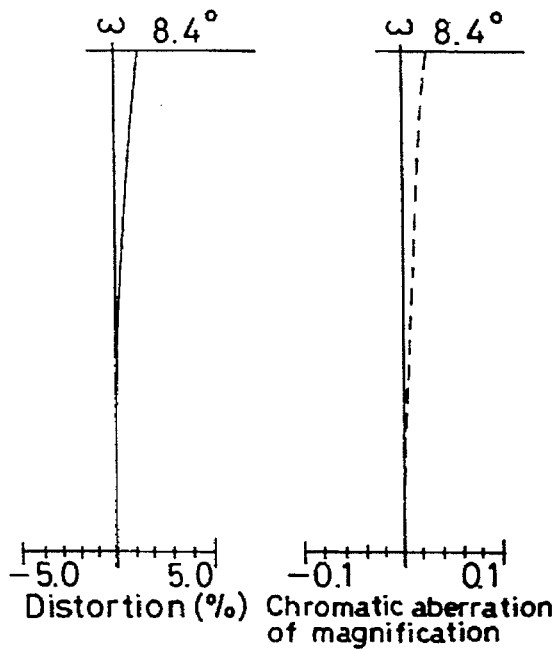
FIG.9I  FIG.9J  FIG.9K  FIG.9L

FIG. 10A
F.NO 4.60
-1.0 1.0
Spherical
aberration
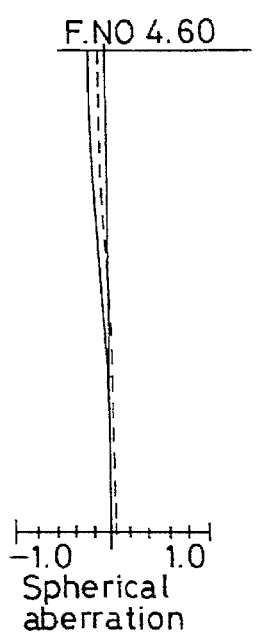
FIG. 10B
ω 36.9°
-1.0 1.0
Astigmatism
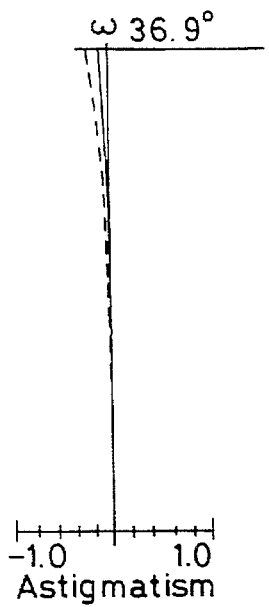
FIG. 10C
ω 36.9°
-5.0 5.0
Distortion(%)
FIG. 10D
ω 36.9°
-0.1 0.1
Chromatic aberration
of magnification
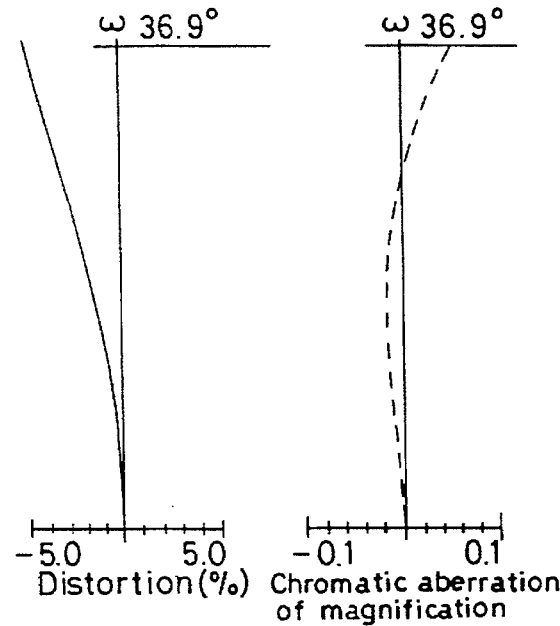
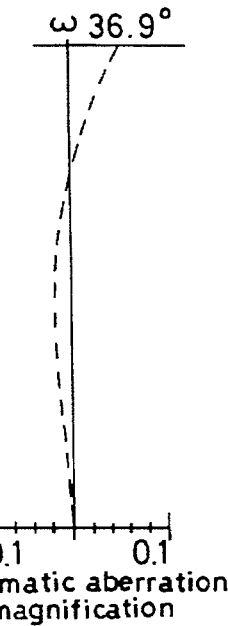
FIG. 10E
F.NO 6.10
-1.0 1.0
Spherical
aberration
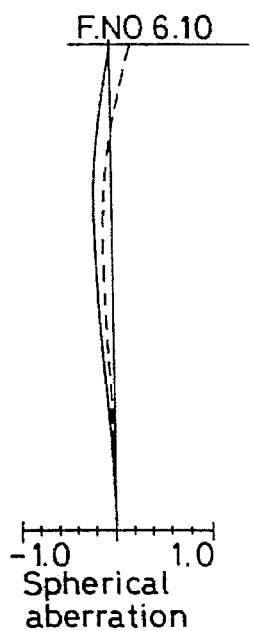
FIG. 10F
ω 21.7°
-1.0 1.0
Astigmatism
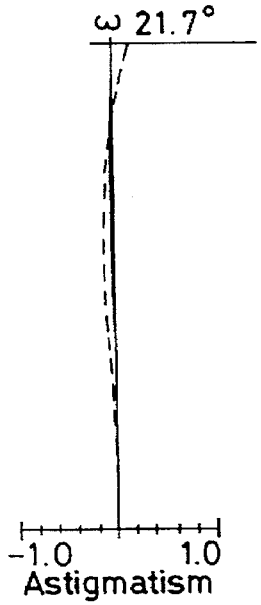
FIG. 10G
ω 21.7°
-5.0 5.0
Distortion(%)
FIG. 10H
ω 21.7°
-0.1 0.1
Chromatic aberration
of magnification
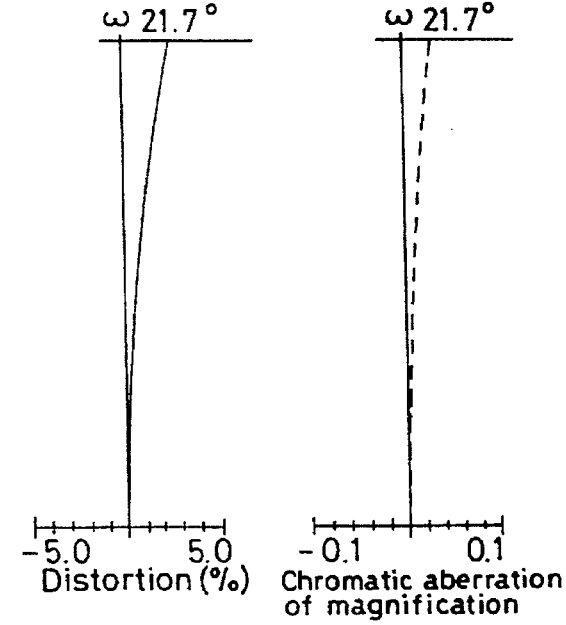
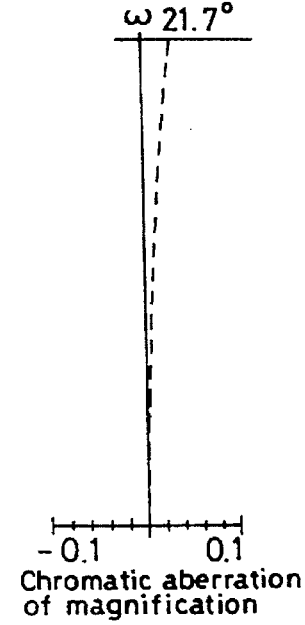

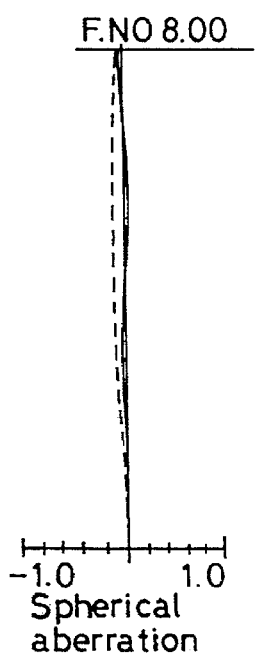
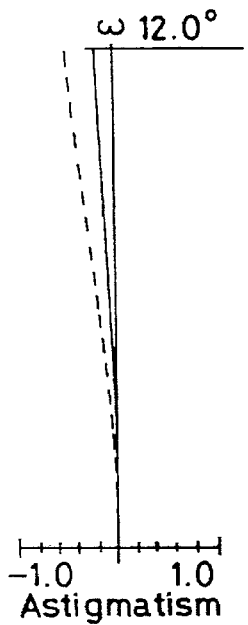
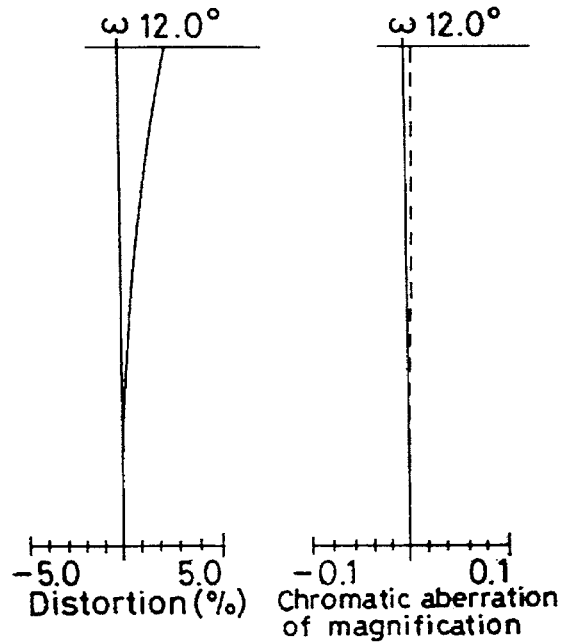
FIG. 10I — Spherical aberration (F.NO 8.00)
FIG. 10J — Astigmatism (ω 12.0°)
FIG. 10K — Distortion (%) (ω 12.0°)
FIG. 10L — Chromatic aberration of magnification (ω 12.0°)

FOUR-UNIT ZOOM LENS SYSTEM HAVING A HIGH ZOOM RATIO

BACKGROUND OF THE INVENTION

The present invention relates generally to a four-unit zoom lens system having a high zoom ratio, and more particularly to a zoom lens system which is suitable for use on lens shutter cameras having a limitless back focus, etc., and which is of compact size albeit having a high zoom ratio.

So far, zoom lenses for use on lens shutter cameras are typically broken down into (1) a two-unit or positive-negative type, (2) a three-unit or positive-positive-negative type, and (3) a three-unit or negative-positive-negative type, all being now commercially available. Of these three typical versions of zoom lenses, the two-unit type (1) cannot basically have any high zoom ratio primarily because of a large fluctuation of aberrations incidental to zooming, and especially because large curvature of field at an intermediate focal length cannot well be compensated for. Moreover, an increase in the amount of movement of each unit is not preferable in camera size reduction.

On the other hand, both the three-unit types (2) and (3) can make compensation for a fluctuation of aberrations during zooming and enable the amount of movement of each unit to be reduced to some extent, so that they can have a zoom ratio higher than that of the two-unit type (1). For instance, typical examples of the three-unit types of zoom lenses having a high zoom ratio are known from JP-A 2-135312, and JP-A 2-201410. The former belongs to the three-unit type (2) with a zoom range of 38 to 135 mm, and the latter to the three-unit type (3) with a zoom range of 35 to 135 mm.

Of the three-unit types, the type with the preceding or first unit having negative refracting power, as in the case of the type (3), is not preferable for achieving compactness, because the spaces between the units reaches a maximum at the wide-angle end, resulting in increases in the overall length and outer diameter of the lens.

In contrast, the three-unit type (2) may prima facie be desired because the preceding or first unit has positive refracting power, so that reductions in the overall length and outer diameter of the lens can be achieved. Even so, it is impossible to make a camera on which this zoom lens is mounted compact, because to make the zoom ratio high results inevitably in an increase in the amount of movement of each unit.

One approach to solving this is to make the three-unit type (2) more sophisticated so as to make up for the degree of freedom of design. For instance, a four-unit type of zoom lenses including the preceding unit of positive refracting power have been put forward, as set forth in JP-A 63-43115 and JP-A 2-223908. All these are a four-unit or positive-negative-positive-negative type. More specifically, the former is a modification of the three-unit or positive-positive-negative type (2), in which the second unit is divided into negative and positive sub-units. This has a zoom ratio of about 3 that was said to be very high at the time an application was filed for that invention. The latter is a so-called double telephoto zoom type designed for use on a lens shutter camera. It is here noted that this type has been developed originally for a single-lens reflex camera. It is also noted that this preceding example has a zoom range of 38 to 135 mm.

As mentioned above, a type of zoom lens with the preceding unit having positive refracting power is desired to achieve high zoom ratios and compactness. However, the zoom lens set forth in JP-A 2-135312 makes it difficult to reduce the size of a camera on which this lens is mounted because of being of the three-unit type wherein the amount of movement of each unit becomes larger during zooming. In this connection, this zoom lens has a telephoto ratio of as high as about 1.2 at the telephoto end.

The zoom lens set forth in JP-A 63-43115 has a telephoto ratio of about 1.1 at the telephoto end. However, this is not preferable because some considerable strictness is given on the accuracy of decentration between the sub-units formed by dividing the second unit of the three-unit or positive-positive-negative type.

The zoom lens set forth in JP-A 2-223908 has a telephoto ratio of about 1.0 at the telephoto end. However, this is not preferable because the space between the second and third units reaches a maximum at the wide-angle end with the entrance pupil located farther, resulting in a large increase in the outer diameters of the lenses of the first and second units. Although the amount of movement of each unit is reduced, this is again not preferable because of an increase in the overall length of the lens at the wide-angle end.

SUMMARY OF THE INVENTION

In view of such situations, an object of the invention is to provide a four-unit type of zoom lens system which is of compact size albeit having a high zoom ratio.

According to the invention, the above object is achieved by the provision of a four-unit type of zoom lens system having a high zoom ratio, which comprises, in order from the object side, a first lens unit having positive refracting power, a second lens unit having positive refracting power, a third lens unit having negative refracting power, and a fourth lens unit having negative refracting power, wherein said first to fourth lens units are all movable toward the object side on the optical axis for zooming from the wide-angle to telephoto end.

Preferably, the space between the first and second lens units becomes wide during zooming from the wide-angle to telephoto end.

Preferably, the space between the second and third lens units becomes narrow during zooming from the wide-angle to telephoto end.

Preferably, the space between the third and fourth lens units becomes relatively wider at the telephoto end than at the wide-angle end.

Preferably, the magnifications of both the third and fourth lens units increase during zooming from the wide-angle to telephoto end.

Preferably, the zoom lens system according to the invention conforms to the following condition (1):

$$0.3 < |f_{34}|/f_W < 1.1 \qquad (1)$$

where $f_W$ is the focal length of the overall system at the wide-angle end, and $f_{34}$ is the composite focal length of the third and fourth lens units at the wide-angle end.

Preferably, the zoom lens system according to the invention conforms to the following condition (2):

$$1 < \beta_{3W} \qquad (2)$$

where $\beta_{3W}$ is the paraxial lateral magnification of the third lens unit at the wide-angle end.

Preferably, the zoom lens system according to the invention conforms to the following condition (3):

$$1 < \beta_{4W} \qquad (3)$$

where $\beta_{4W}$ is the paraxial lateral magnification of the fourth lens unit at the wide-angle end.

Preferably, the second lens unit has at least one aspheric surface, and then conforms to the following condition (4):

$$0 < \Delta_p / \phi_p, \phi_p = (n_p' - n_p)/r_p \quad (4)$$

where $r_p$ is the paraxial radius of curvature of the aspheric surface, $n_p$, and $n_p'$ are the refractive indices of the medium before and after the aspheric surface, and $\Delta_p$ is the amount of the aspheric surface at an effective radius.

Preferably, the third lens unit includes at least one aspheric surface and, again, the fourth lens unit includes at least one aspheric surface.

In these case, each aspheric surface should preferably conform to the following conditions (5):

$$\Delta_N / \phi_N < 0, \phi_N = (n_N' - n_N)/r_N \quad (5)$$

where $r_N$ is the paraxial radium of curvature of the aspheric surface, $n_N$ and $n_N'$ are the refractive indices of the medium before and after the aspheric surface, and $\Delta_N$ is the amount of the aspheric surface at an effective radius.

Preferably, the zoom lens system of the invention conforms to the following condition (6):

$$1.7 < N_N \quad (6)$$

wherein $N_N$ is the mean value of the refractive indices of negative lenses incorporated in the third and fourth lens units.

Preferably, a stop is interposed between the lens surfaces of the second lens unit proximate to the object and image sides.

For the purpose of compensating for aberrations, it is then desired that the lens surface on the object side with respect to the stop be convex on the image side, and the lens surface on the image side with respect to the stop be convex on the object side.

To correct aberrations, it is desired that the lens surface of the third lens unit proximate to the object side be concave on the object side.

Reference will now be made to why the above arrangement is adopted and how it works.

As already mentioned with regard to the prior art, to achieve high zoom ratios and compactness it is preferably to use a zoom type with the preceding unit of positive refracting power, as in the case of the three-unit or positive-positive-negative type. However, a mere increase in the zoom ratio fails to provide a camera of compact size, because the amount of movement of the units is increased, resulting in an increase in the overall lens length at the wide-angle end. Also the division of the second unit for achieving a four-unit type is not practical, because some considerable strictness is imposed on the accuracy of decentration between the sub-units of the second unit.

This is the reason the present inventors come up with a novel four-unit type of zoom lens system.

Referring to the three- or positive-positive-negative unit type mentioned above, a substantial part of zooming action is born by the third unit. The second unit acts as a compensator, while the first unit makes good-enough compensation for aberrations, esp., curvature of field and distortion. Thus, the overall lens length at the telephoto end is substantially determined by the amount of movement of the third unit. To reduce this, therefore, there may be no choice all but to increase the power of the third lens. However, a mere increase in the power of the third unit results in making compensation for aberrations difficult. In other words, the power of the third unit is determined within the range in which practical correction of aberrations is achievable, with the proviso that the third unit has the necessary zooming action and, corresponding to this, the overall lens length at the telephoto end is determined.

To solve the above problem, the present inventors come up with a four-unit or positive-positive-negative-negative type of zoom lens system, or propose a three- or positive-positive-negative type of zoom lens system in which the third unit of negative refracting power is divided into two. Reference will now be made by reference to the accompanying drawings.

FIG. 2 shows the unit arrangement of a conventional three-unit type, and the orbit of movement of each unit. As illustrated, this is composed of a first unit G1 of positive refracting power, a second unit G2 of positive refracting power, and a third unit G3 of negative refracting power, which are all moved toward the object side for zooming from the wide-angle to telephoto space. At this time, the space between the first and second units G1 and G2 becomes wide and the space between the second and third units G2 and G3 becomes narrow, so that the actions mentioned above can be obtained.

FIG. 1 shows the four-unit type according to the present invention, which comprises a first unit G1 of positive refracting power, a second unit G2 of positive refracting power, a third unit G3 of negative refracting power, and a fourth unit G4 of negative refracting power, which are all moved toward the object side for zooming from the wide-angle to telephoto space with an increase in the space between the first and second units G1 and G2 and a decrease in the space between the second and third units G2 and G3. To achieve more effective zooming action, the third and fourth units G3 and G4 are moved for zooming from the wide-angle to telephoto space with increases in the magnifications of both.

It is then desired that the present zoom lens system conform to the following conditional formulae:

$$0.3 < |f_{34}|/f_W < 1.1 \quad (1)$$

$$1 < \beta_{3W} \quad (2)$$

$$1 < \beta_{4W} \quad (3)$$

Here $f_W$ is the focal length of the overall system at the wide-angle end, $f_{34}$ is the composite focal length of the third and fourth units G3 and G4 at the wide-angle end, and $\beta_{3W}$ and $\beta_{4W}$ are the paraxial lateral magnifications of the third and fourth units G3 and G4, respectively.

As already noted, Conditional Formula (1) lays down the most important condition for achieving compactness. As the upper limit of 1.1 is exceeded, the composite power of the third and fourth units G3 and G4 grows weak; it is impossible to achieve compactness. At less than the lower limit of 0.3, that composite power becomes strong. This, even though the third unit is divided into two groups, will render good-enough correction of aberrations difficult due to their too strong powers.

Conditional Formulae (2) and (3) lay down the condition for ensuring a sufficient back focus at the wide-angle end. As the upper limits are exceeded, the back focus becomes too short to decrease the outer diameter of the third unit G3 or the fourth unit G4. This is also not preferable due to some problems, e.g., transfer of dust deposited on lens surfaces to film, and a flare caused by internal reflection.

To achieve satisfactory correction of aberrations, it is desired to use at least one aspheric surface in the second unit G2. This aspheric surface (surfaces) used in the second unit G2 then conforms to the following conditional formula (4):

$$0 < \Delta_p/\phi_p, \phi_p = (n_{p'} - n_p)/r_p \quad (4)$$

where $r_p$ is the paraxial radius of curvature of the aspheric surface, $n_{p'}$, and $n_p$ are the refractive indices of the medium before and after the aspheric surface, and $\Delta_p$ is the amount of the aspheric surface at an effective radius.

Conditional Formula (4) shows that the aspheric surface of the second unit G2 is of such configuration that its positive (or negative) refracting power grows weak (or strong) as it goes off from the optical axis. Such an aspheric surface of the second unit G2 is effective to make compensation for spherical aberration and coma.

Moreover, it is desired to use at least one aspheric surface in the third or fourth unit G3 or G4. The aspheric surface (surfaces) used in the third or fourth unit G3 or G4 should then preferably conform to the following condition (5):

$$\Delta_N/\phi_N < 0, \phi_N = (n_{N'} - n_N)/r_N \quad (5)$$

where $r_N$ is the paraxial radium of curvature of the aspheric surface, $n_N$ and $n_{N'}$ are the refractive indices of the medium before and after the aspheric surface, and $\Delta_N$ is the amount of the aspheric surface at an effective radius.

Conditional Formula (5) shows that the aspheric surface of the third or fourth unit G3 or G4 is of such configuration that its negative (or positive) refracting power grows weak (or strong) as it goes off from the optical axis. Such an aspheric surface of the third or fourth unit G3 or G4 is effective to make compensation for spherical aberration and coma.

In the present invention, Petzval image surface is prone to over-correction due to an increase in the number of the units of negative refracting power. Preferably, this is avoided by conforming to the following condition (6):

$$1.7 < N_N \quad (6)$$

Here $N_N$ is the mean value of the refractive indices of the negative lenses contained in the third and fourth units G3 and G4. By conforming to Conditional Formula (6) it is possible to make good-enough compensation for curvature of field and, hence, a photograph of good-enough image quality all over the image plane.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7 is an aberration diagram showing spherical aberration, astigmatism, distortion, and chromatic aberration of magnification of Example 1 with respect to the object point at infinity at the wide-angle end (a), intermediate focal length (b) and telephoto end (c), FIG. 10 is an aberration diagram of Example 4 similar to FIG. 7.

DESCRIPTION OF THE PREFERRED EMBODIMENTS

Figure 1:
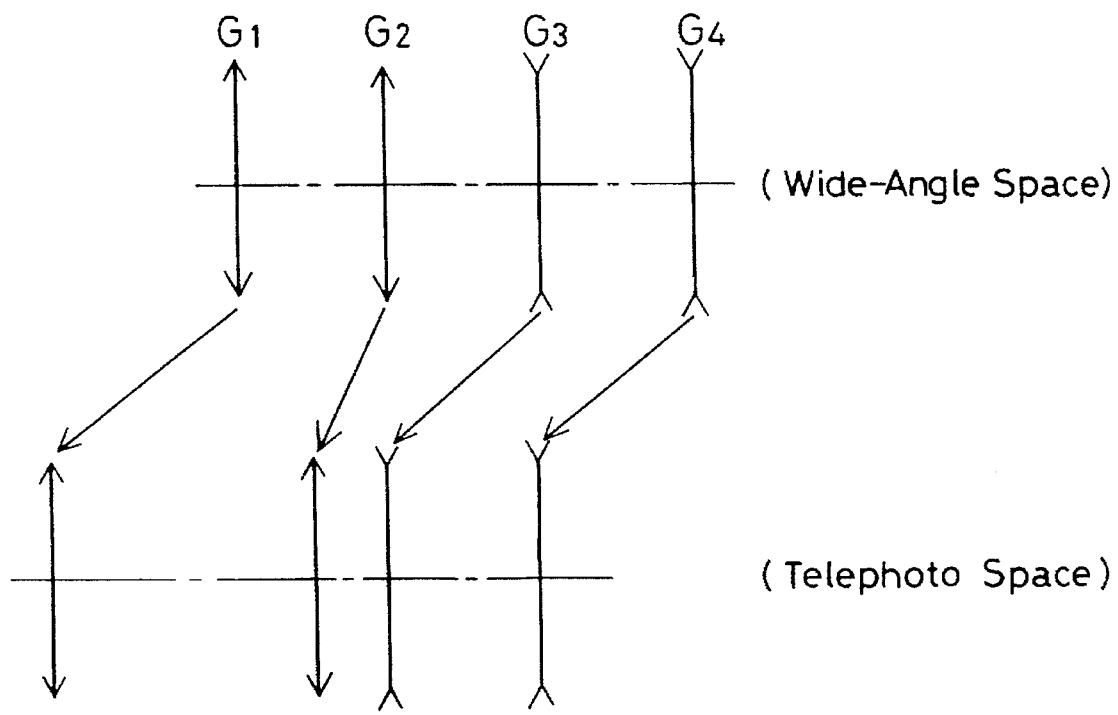
FIG. 1 is a schematic of the arrangement, and orbits of movement, of the units of the four-unit type of zoom lens system according to the invention.
Figure 2:
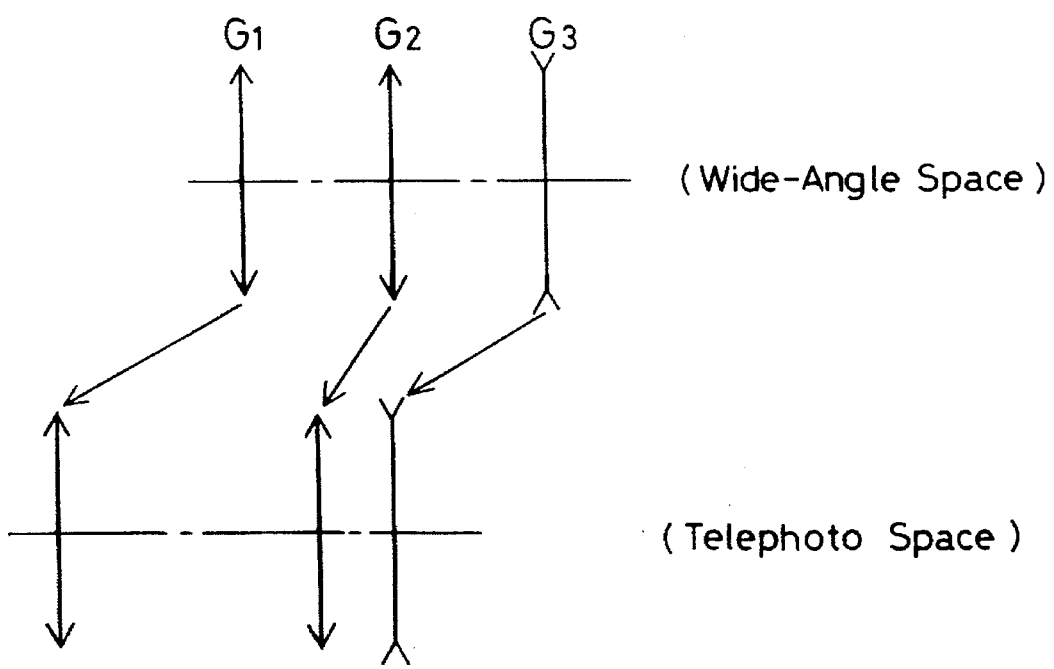
FIG. 2 is a schematic of the arrangement, and orbits of movement, of the units of a conventional three-unit type of zoom lens.
Figure 3A:
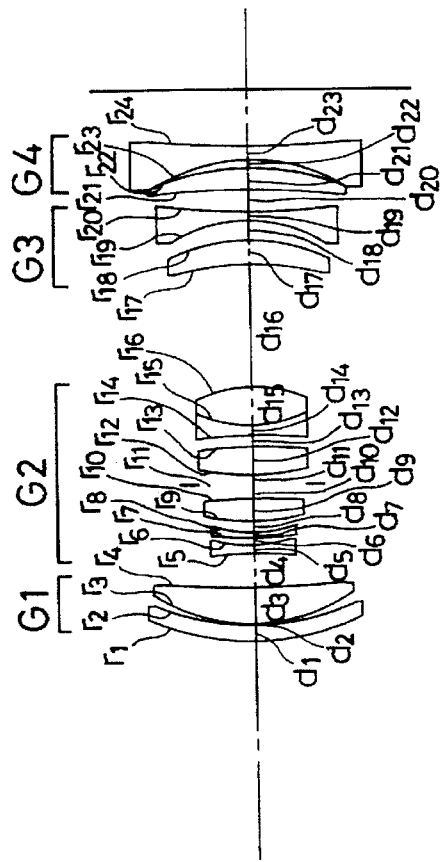
FIG. 3 is a sectional schematic of the lens arrangement of Example 1 at the wide-angle (a) and telephoto (b) ends.
Figure 3B:
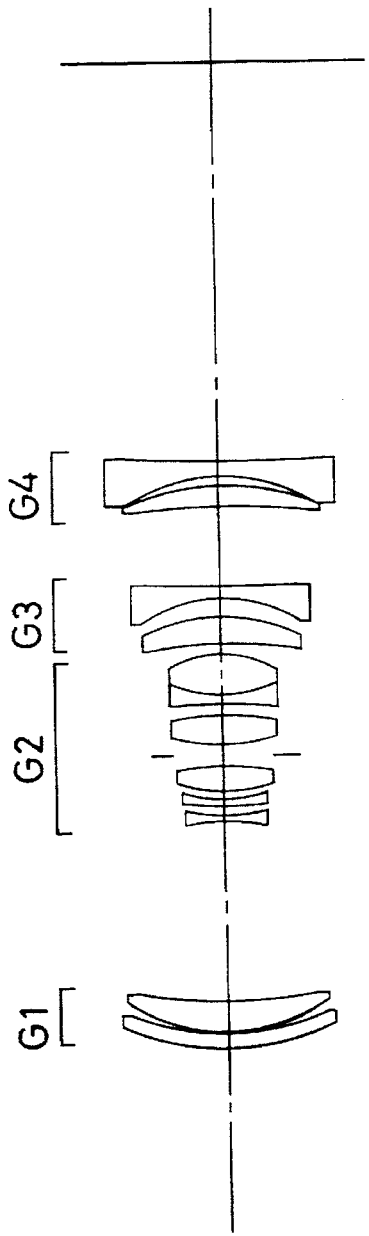
Figure 4A:
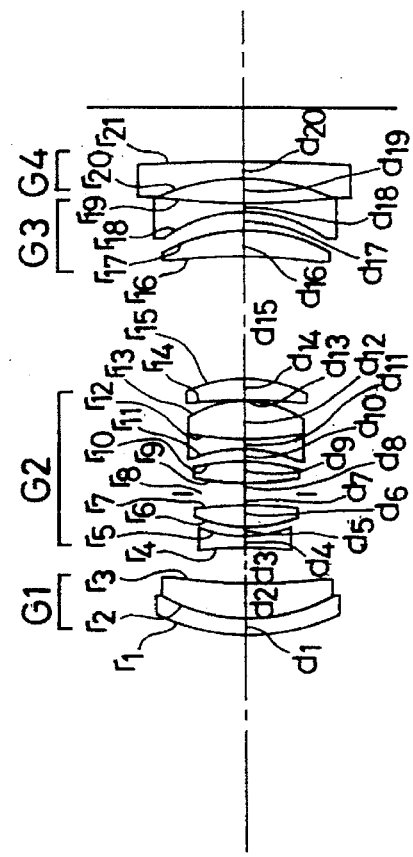
FIG. 4 is a sectional schematic of Example 2 similar to FIG. 3.
Figure 4B:
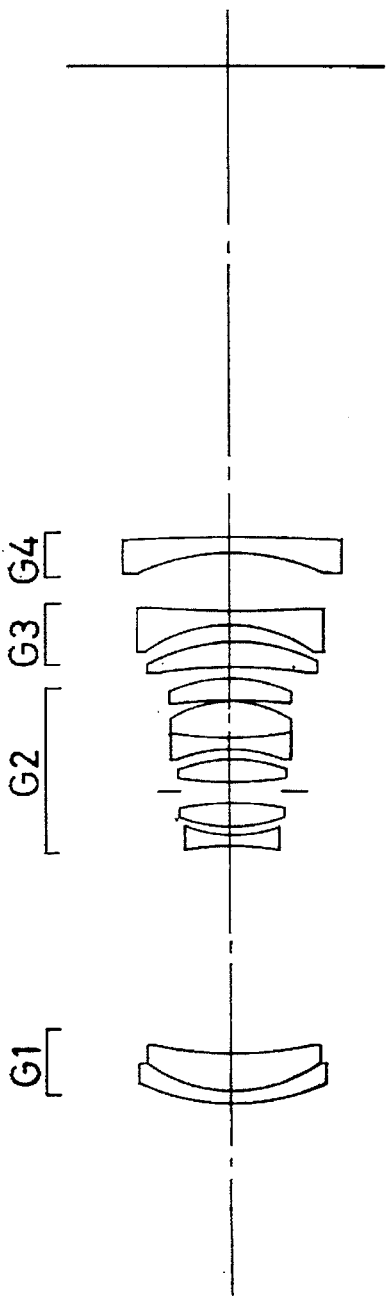
Figure 5A:
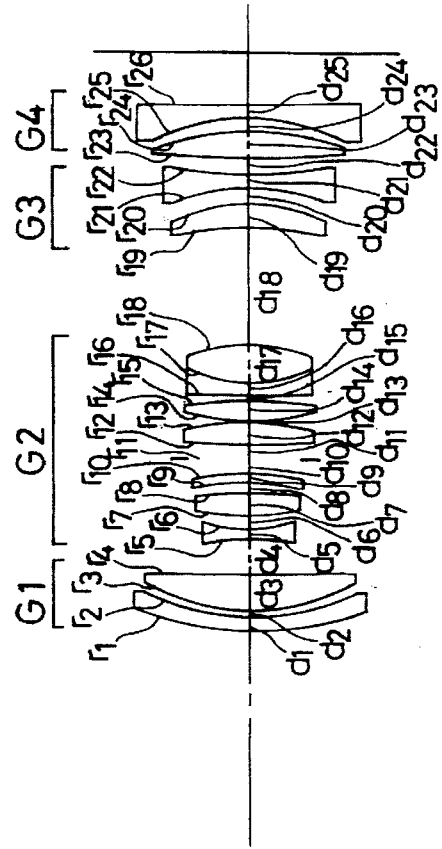
FIG. 5 is a sectional schematic of Example 3 similar to FIG. 3.
Figure 5B:
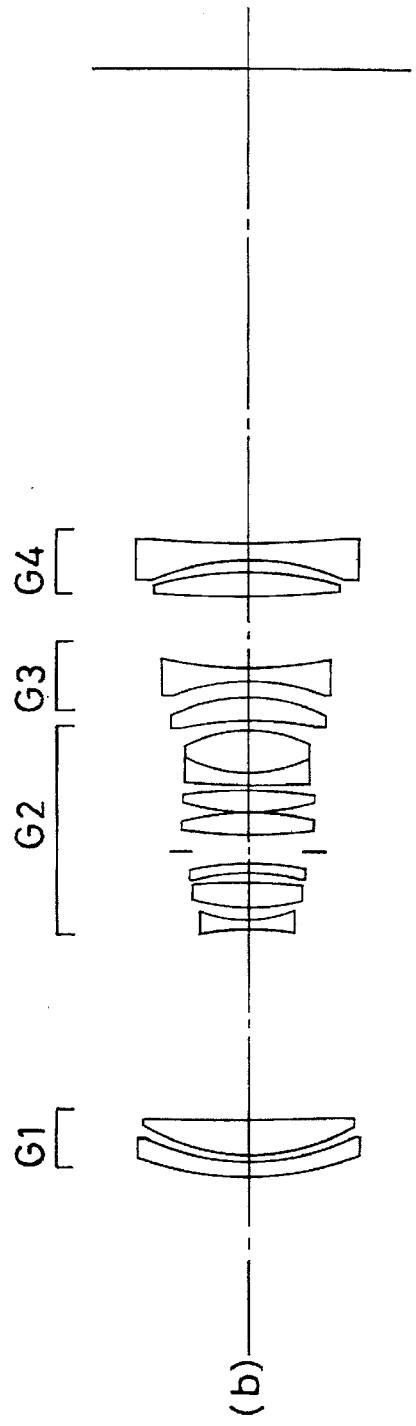
Figure 6:
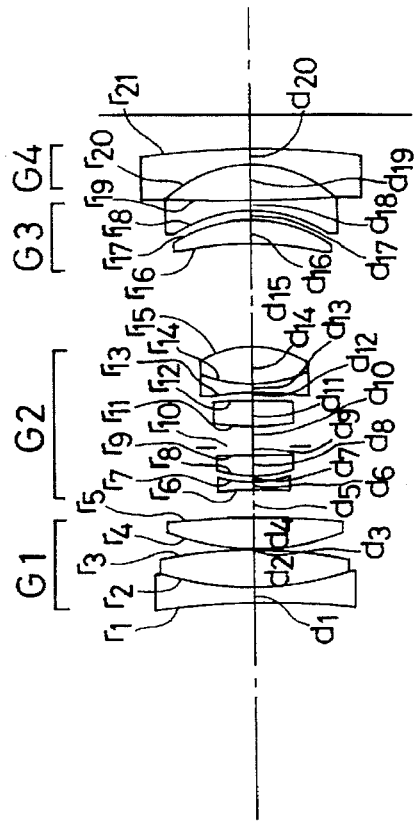
FIG. 6 is a sectional schematic of Example 4 similar to FIG. 3.
Figure 6:
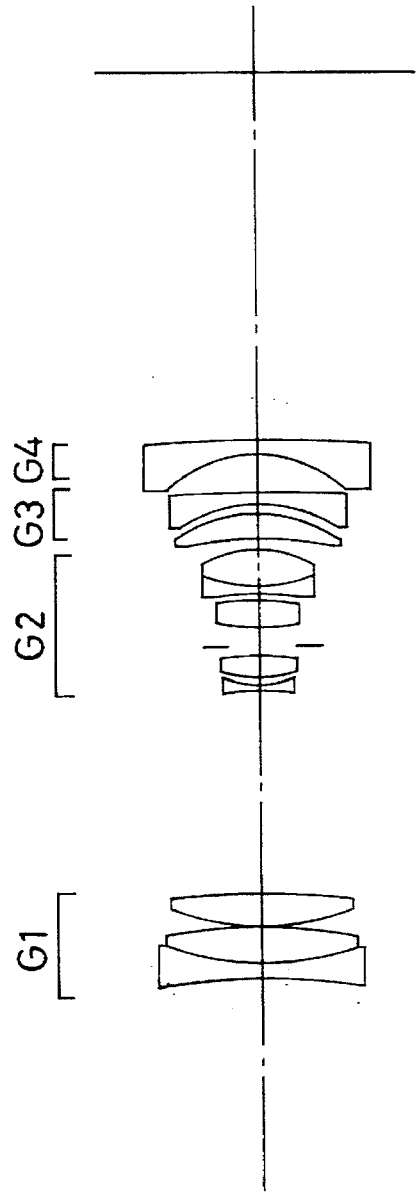

In the ensuing description, Examples 1 to 4 of the four-unit type of zoom lens system having a high zoom ratio according to the invention will be explained. FIGS. 3 to 6 shows sections of the lens arrangements of Examples 1 to 4 at the wide-angle end (a) and telephoto end (b).

According to Example 1 having a focal length of 38 to 135 mm, all units G1, G2, G3 and G4 are moved toward the object side for zooming from the wide-angle to telephoto end, with the space between the first and second units G1 and G2 becoming wide, the space between the second and third units G2 and G3 becoming narrow, and the space between the third and fourth units G3 and G4 becoming wide. The first unit G1 consists of two lens elements, i.e., a negative meniscus lens convex on the object side and a positive meniscus lens convex on the object side; the second unit G2 consists of six lens elements plus one stop, i.e., a double-concave lens, a negative meniscus lens convex on the object side, a double-convex lens, a stop, a double-convex lens and a cemented lens made up of double-concave and double-convex lenses; the third lens unit G3 consists of two elements, i.e., a positive meniscus lens convex on the image side and a double-concave lens; and the fourth lens unit G4 consists of two elements, i.e., a positive meniscus lens convex on the image side and a double-concave lens. The stop is located in the second unit G2, and two aspheric surfaces are provided, one used for the image-side surface of the double-convex lens of the second unit G2 located after the stop, and the other for the object-side surface of the double-concave lens of the third lens unit G3.

According to Example 2 having a focal length of 38 to 150 mm, all units G1, G2, G3 and G4 are moved toward the object side for zooming from the wide-angle to telephoto end, with the space between the first and second units G1 and G2 becoming wide, the space between the second and third units G2 and G3 becoming narrow, and the space between the third and fourth units G3 and G4 becoming wide and then narrow. The first unit G1 consists of one lens element, i.e., a cemented lens made up of negative and positive meniscus lenses convex on the object side; the second unit G2 consists of six lens elements plus one stop, i.e., a double-concave lens, a double-convex lens, a stop, a double-convex lens, a cemented lens made up of double-concave and double-convex lenses and a positive meniscus lens convex on the image side; the third lens unit G3 consists of two lens elements, i.e., a positive meniscus lens convex on the image side and a double-concave lens; and the fourth lens unit G4 consists of one lens element, i.e., a negative meniscus lens convex on the image side. The stop is located in the second unit G2, and three aspheric surfaces are provided, one used for the first surface of the first unit G1, another for the image-side surface of the double-convex lens of the second unit G2 located after the stop, and still another for the object-side surface of the double-concave lens of the third unit G3.

According to Example 3 having a focal length of 38 to 150 mm, all units G1, G2, G3 and G4 are moved toward the object side for zooming from the wide-angle to telephoto end, with the space between the first and second units G1 and G2 becoming wide, the space between the second and third units G2 and G3 becoming narrow, and the space between the third and fourth units G3 and G4 becoming wide. The first unit G1 consists of two lens elements, i.e., a negative meniscus lens convex on the object side and a positive meniscus lens convex on the object side; the second unit G2 consists of six lens elements plus one stop, i.e., a double-concave lens, a double-convex lens, a negative meniscus lens convex on the image side, a stop, a double-convex lens, a double-convex lens and a cemented lens made up of a negative meniscus lens convex on the object side and a double-convex lens; the third unit G3 consists of two lens elements, i.e., a positive meniscus lens convex on the image side and a double-concave lens; and the fourth unit G4 consists of two lens elements, i.e., a double-convex lens and a double-concave lens. The stop is located in the second unit G2, and three aspheric surfaces are provided, one used for the last surface of the second unit G2, another for the object-side surface of the double-concave lens of the third unit G3, and still another for the object-side surface of the double-concave lens of the fourth unit G4.

According to Example 4 having a focal length of 28 to 105 mm, all units G1, G2, G3 and G4 are moved toward the object side for zooming from the wide-angle to telephoto end, with the space between the first and second units G1 and G2 becoming wide, the space between the second and third units G2 and G3 becoming narrow, and the space between the third and fourth units G3 and G4 becoming wide and then narrow. The first unit G1 consists of two lens elements, i.e., a cemented lens made up of double-concave and double-convex lenses and a double-convex lens; the second unit G2 consists of four lens elements plus one stop, i.e., a double-concave lens, a double-convex lens, a stop, a double-convex lens and a cemented lens made up of double-concave and double-convex lenses; the third unit G3 consists of two lens elements, i.e., a positive meniscus lens convex on the image side and a negative meniscus lens convex on the image side; and the fourth unit G4 consists of one lens element, i.e., a negative meniscus lens convex on the image side. The stop is located in the second unit G2, and only one aspheric surface is used for the image-side surface of the double-convex lens of the second unit G2 located after the stop.

Set out below are lens data of each example, in which symbols hereinafter referred to but not hereinbefore have the following means.

f: the focal length of the overall system
$F_{NO}$: F-number
$2\omega$: the field angle
$f_B$: the back focus
$\beta_3$: the paraxial lateral magnification of the third unit G3
$\beta_4$: the paraxial lateral magnification of the fourth unit G4
$r_1, r_2 \ldots$ : the radii of curvature of the lenses
$d_1, d_2 \ldots$ : the spaces between the lenses
$n_{d1}, n_{d2} \ldots$ : the d-line refractive indices of the lenses
$v_{d1}, v_{d2} \ldots$ : Abbe's number of the lenses Here it is noted that, with the proviso that x stands for the optical axis direction and y represents the direction perpendicular to the optical axis, aspheric configuration is given by $$x=(y^2/r)/[1+\{1-P(y/r)^2\}^{1/2}]+A_4y^4+A_6y^6+A_8y^8+A_{10}y^{10}$$

where r is the paraxial radius of curvature, P is the conical coefficient, and $A_4$, $A_6$, $A_8$ and $A_{10}$ are the aspheric coefficients.

Example 1
f = 39.1 ~ 71.4 ~ 130.3
$F_{NO}$ = 4.6 ~ 6.1 ~ 8.0
$2\omega$ = 57.84 ~ 33.66 ~ 18.82°
$f_B$ = 6.9 ~ 19.3 ~ 53.8
$\beta_3$ = 1.34 ~ 1.75 ~ 2.21
$\beta_4$ = 1.08 ~ 1.24 ~ 1.67

| | | | | | | | | | |
|---|---|---|---|---|---|---|---|---|---|
| $r_1$ | = | 35.2420 | | $d_1$ | = | 2.000 | $n_{d1}$ = | 1.84666 | $v_{d1}$ = 23.78 |
| $r_2$ | = | 29.9510 | | $d_2$ | = | 0.500 | | | |
| $r_3$ | = | 25.6000 | | $d_3$ | = | 4.500 | $n_{d2}$ = | 1.49700 | $v_{d2}$ = 81.61 |
| $r_4$ | = | 128.6170 | | $d_4$ | = | (Variable) | | | |
| $r_5$ | = | −30.3720 | | $d_5$ | = | 1.000 | $n_{d3}$ = | 1.88300 | $v_{d3}$ = 40.78 |
| $r_6$ | = | 28.0770 | | $d_6$ | = | 0.980 | | | |
| $r_7$ | = | 61.1210 | | $d_7$ | = | 1.000 | $n_{d4}$ = | 1.77250 | $v_{d4}$ = 49.66 |
| $r_8$ | = | 15.6480 | | $d_8$ | = | 0.920 | | | |
| $r_9$ | = | 20.1570 | | $d_9$ | = | 3.500 | $n_{d5}$ = | 1.78472 | $v_{d5}$ = 25.68 |
| $r_{10}$ | = | −57.1010 | | $d_{10}$ | = | 1.500 | | | |
| $r_{11}$ | = | ∞ (Stop) | | $d_{11}$ | = | 1.500 | | | |
| $r_{12}$ | = | 28.2340 | | $d_{12}$ | = | 4.000 | $n_{d6}$ = | 1.53172 | $v_{d6}$ = 48.90 |
| $r_{13}$ | = | −36.7070 | (Aspheric) | $d_{13}$ | = | 1.200 | | | |
| $r_{14}$ | = | −165.7780 | | $d_{14}$ | = | 1.500 | $n_{d7}$ = | 1.80518 | $v_{d7}$ = 25.43 |
| $r_{15}$ | = | 16.9400 | | $d_{15}$ | = | 5.500 | $n_{d8}$ = | 1.56873 | $v_{d8}$ = 63.16 |
| $r_{16}$ | = | −15.3930 | | $d_{16}$ | = | (Variable) | | | |
| $r_{17}$ | = | −54.2730 | | $d_{17}$ | = | 4.000 | $n_{d9}$ = | 1.76180 | $v_{d9}$ = 27.11 |
| $r_{18}$ | = | −23.9700 | | $d_{18}$ | = | 2.170 | | | |
| $r_{19}$ | = | −19.1930 | (Aspheric) | $d_{19}$ | = | 2.000 | $n_{d10}$ = | 1.80400 | $v_{d10}$ = 46.57 |
| $r_{20}$ | = | 322.2970 | | $d_{20}$ | = | (Variable) | | | |
| $r_{21}$ | = | −354.2300 | | $d_{21}$ | = | 3.500 | $n_{d11}$ = | 1.76182 | $v_{d11}$ = 26.52 |
| $r_{22}$ | = | −34.5340 | | $d_{22}$ | = | 1.210 | | | |
| $r_{23}$ | = | −25.0470 | | $d_{23}$ | = | 2.000 | $n_{d12}$ = | 1.80400 | $v_{d12}$ = 46.57 |
| $r_{24}$ | = | 718.3720 | | | | | | | |

-continued

Zooming Spaces

| f | 39.1 | 71.4 | 130.3 |
|---|---|---|---|
| $d_4$ | 5.0000 | 19.9120 | 24.2920 |
| $d_{16}$ | 15.6650 | 6.9050 | 1.5010 |
| $d_{20}$ | 2.0000 | 8.9090 | 10.2480 |

Aspherical Coefficients

13th surface

| P | = | 1.0000 |
|---|---|---|
| $A_4$ | = | $0.48167 \times 10^{-4}$ |
| $A_6$ | = | $0.26683 \times 10^{-7}$ |
| $A_8$ | = | $0.16257 \times 10^{-8}$ |
| $A_{10}$ | = | $-0.84437 \times 10^{-11}$ |

19th surface

| P | = | 1.0012 |
|---|---|---|
| $A_4$ | = | $0.14608 \times 10^{-4}$ |
| $A_6$ | = | $0.28754 \times 10^{-7}$ |
| $A_8$ | = | $0.32531 \times 10^{-10}$ |
| $A_{10}$ | = | 0 |

Example 2

$f = 39.1 \sim 75.5 \sim 145.5$
$F_{NO} = 4.6 \sim 6.1 \sim 8.0$
$2\omega = 57.84 \sim 31.93 \sim 16.89°$
$f_B = 7.0 \sim 24.1 \sim 63.4$
$\beta_3 = 1.17 \sim 1.45 \sim 1.60$
$\beta_4 = 1.19 \sim 1.59 \sim 2.51$

| | | | | | | | | | |
|---|---|---|---|---|---|---|---|---|---|
| $r_1$ = | 27.3940 | (Aspheric) | $d_1$ = | 2.000 | $n_{d1}$ | = | 1.80518 | $v_{d1}$ = | 25.43 |
| $r_2$ = | 21.5300 | | $d_2$ = | 5.000 | $n_{d2}$ | = | 1.48749 | $v_{d2}$ = | 70.20 |
| $r_3$ = | 75.0810 | | $d_3$ = | (Variable) | | | | | |
| $r_4$ = | −34.6580 | | $d_4$ = | 1.500 | $n_{d3}$ | = | 1.77250 | $v_{d3}$ = | 49.66 |
| $r_5$ = | 14.6990 | | $d_5$ = | 1.160 | | | | | |
| $r_6$ = | 22.0690 | | $d_6$ = | 3.000 | $n_{d4}$ | = | 1.76182 | $v_{d4}$ = | 26.52 |
| $r_7$ = | −55.9830 | | $d_7$ = | 1.500 | | | | | |
| $r_8$ = | ∞ (Stop) | | $d_8$ = | 1.500 | | | | | |
| $r_9$ = | 63.5910 | | $d_9$ = | 3.000 | $n_{d5}$ | = | 1.51633 | $v_{d5}$ = | 64.15 |
| $r_{10}$ = | −22.7880 | (Aspheric) | $d_{10}$ = | 1.320 | | | | | |
| $r_{11}$ = | −20.9070 | | $d_{11}$ = | 1.500 | $n_{d6}$ | = | 1.78470 | $v_{d6}$ = | 26.30 |
| $r_{12}$ = | 49.5720 | | $d_{12}$ = | 5.000 | $n_{d7}$ | = | 1.51633 | $v_{d7}$ = | 64.15 |
| $r_{13}$ = | −15.8000 | | $d_{13}$ = | 0.200 | | | | | |
| $r_{14}$ = | −74.2190 | | $d_{14}$ = | 3.000 | $n_{d8}$ | = | 1.51633 | $v_{d8}$ = | 64.15 |
| $r_{15}$ = | −18.5730 | | $d_{15}$ = | (Variable) | | | | | |
| $r_{16}$ = | −78.4020 | | $d_{16}$ = | 4.000 | $n_{d9}$ | = | 1.80518 | $v_{d9}$ = | 25.43 |
| $r_{17}$ = | −23.0330 | | $d_{17}$ = | 1.880 | | | | | |
| $r_{18}$ = | −18.3240 | (Aspheric) | $d_{18}$ = | 1.800 | $n_{d10}$ | = | 1.77250 | $v_{d10}$ = | 49.66 |
| $r_{19}$ = | 316.7320 | | $d_{19}$ = | (Variable) | | | | | |
| $r_{20}$ = | −31.8430 | | $d_{20}$ = | 2.000 | $n_{d11}$ | = | 1.80400 | $v_{d11}$ = | 46.57 |
| $r_{21}$ = | −436.2390 | | | | | | | | |

Zooming Spaces

| f | 39.1 | 75.5 | 145.5 |
|---|---|---|---|
| $d_3$ | 5.0000 | 19.9330 | 28.2570 |
| $d_{15}$ | 16.3070 | 6.0370 | 1.5010 |
| $d_{19}$ | 3.0530 | 9.4200 | 8.1290 |

Aspherical Coefficients

1st surface

| P | = | 1.0000 |
|---|---|---|
| $A_4$ | = | $0.30725 \times 10^{-7}$ |
| $A_6$ | = | $-0.24135 \times 10^{-9}$ |
| $A_8$ | = | $0.25687 \times 10^{-11}$ |
| $A_{10}$ | = | 0 |

10th surface

| P | = | 1.0000 |
|---|---|---|
| $A_4$ | = | $0.48250 \times 10^{-4}$ |
| $A_6$ | = | $0.81447 \times 10^{-7}$ |
| $A_8$ | = | $-0.43664 \times 10^{-9}$ |
| $A_{10}$ | = | $0.11008 \times 10^{-11}$ |

-continued

18面

| | | |
|---|---|---|
| P | = | 1.0000 |
| $A_4$ | = | $0.11855 \times 10^{-4}$ |
| $A_6$ | = | $0.32106 \times 10^{-7}$ |
| $A_8$ | = | $-0.44419 \times 10^{-9}$ |
| $A_{10}$ | = | $0.20139 \times 10^{-11}$ |

Example 3

$f = 39.1 \sim 75.5 \sim 145.5$
$F_{NO} = 3.6 \sim 5.4 \sim 8.0$
$2\omega = 57.84 \sim 31.93 \sim 16.89°$
$f_B = 7.0 \sim 22.3 \sim 65.5$
$\beta_3 = 1.36 \sim 1.79 \sim 2.27$
$\beta_4 = 1.07 \sim 1.27 \sim 1.83$

| | | | | | | | | |
|---|---|---|---|---|---|---|---|---|
| $r_1$ | = | 43.7150 | | $d_1$ | = | 2.000 | $n_{d1}$ = 1.84666 | $v_{d1}$ = 23.78 |
| $r_2$ | = | 31.7650 | | $d_2$ | = | 0.920 | | |
| $r_3$ | = | 27.2710 | | $d_3$ | = | 5.000 | $n_{d2}$ = 1.51454 | $v_{d2}$ = 54.69 |
| $r_4$ | = | 270.8610 | | $d_4$ | = | (Variable) | | |
| $r_5$ | = | −30.0870 | | $d_5$ | = | 1.300 | $n_{d3}$ = 1.88300 | $v_{d3}$ = 40.78 |
| $r_6$ | = | 18.5320 | | $d_6$ | = | 1.690 | | |
| $r_7$ | = | 33.8190 | | $d_7$ | = | 3.500 | $n_{d4}$ = 1.84666 | $v_{d4}$ = 23.78 |
| $r_8$ | = | −59.0100 | | $d_8$ | = | 1.450 | | |
| $r_9$ | = | −27.1000 | | $d_9$ | = | 1.200 | $n_{d5}$ = 1.72916 | $v_{d5}$ = 54.68 |
| $r_{10}$ | = | −35.0200 | | $d_{10}$ | = | 2.120 | | |
| $r_{11}$ | = | ∞ (Stop) | | $d_{11}$ | = | 1.700 | | |
| $r_{12}$ | = | 78.9010 | | $d_{12}$ | = | 3.000 | $n_{d6}$ = 1.56732 | $v_{d6}$ = 42.83 |
| $r_{13}$ | = | −54.2940 | | $d_{13}$ | = | 0.200 | | |
| $r_{14}$ | = | 33.5370 | | $d_{14}$ | = | 3.000 | $n_{d7}$ = 1.56732 | $v_{d7}$ = 42.83 |
| $r_{15}$ | = | −71.2530 | | $d_{15}$ | = | 0.650 | | |
| $r_{16}$ | = | 481.5710 | | $d_{16}$ | = | 1.500 | $n_{d8}$ = 1.80518 | $v_{d8}$ = 25.43 |
| $r_{17}$ | = | 16.3100 | | $d_{17}$ | = | 6.000 | $n_{d9}$ = 1.51633 | $v_{d9}$ = 64.15 |
| $r_{18}$ | = | −21.3560 | (Aspheric) | $d_{18}$ | = | (Variable) | | |
| $r_{19}$ | = | −45.3540 | | $d_{19}$ | = | 3.500 | $n_{d10}$ = 1.76182 | $v_{d10}$ = 26.52 |
| $r_{20}$ | = | −25.2940 | | $d_{20}$ | = | 2.050 | | |
| $r_{21}$ | = | −30.8570 | (Aspheric) | $d_{21}$ | = | 1.800 | $n_{d11}$ = 1.80400 | $v_{d11}$ = 46.57 |
| $r_{22}$ | = | 66.1420 | | $d_{22}$ | = | (Variable) | | |
| $r_{23}$ | = | 323.3140 | | $d_{23}$ | = | 3.500 | $n_{d12}$ = 1.76182 | $v_{d12}$ = 26.52 |
| $r_{24}$ | = | −47.6200 | | $d_{24}$ | = | 1.800 | | |
| $r_{25}$ | = | −26.6440 | (Aspheric) | $d_{25}$ | = | 2.000 | $n_{d13}$ = 1.80400 | $v_{d13}$ = 46.57 |
| $r_{26}$ | = | 330.6980 | | | | | | |

Zooming Spaces

| f | 39.1 | 75.5 | 145.5 |
|---|---|---|---|
| $d_4$ | 5.0000 | 22.9000 | 26.7260 |
| $d_{18}$ | 15.8560 | 6.8130 | 1.5000 |
| $d_{22}$ | 2.2840 | 8.9090 | 10.1110 |

Aspherical Coefficients

18th surface

| | | |
|---|---|---|
| P | = | 1.0000 |
| $A_4$ | = | $0.15660 \pm 10^{-4}$ |
| $A_6$ | = | $0.15389 \pm 10^{-7}$ |
| $A_8$ | = | $-0.34018 \pm 10^{-9}$ |
| $A_{10}$ | = | $0.23221 \pm 10^{-11}$ |

21st surface

| | | |
|---|---|---|
| P | = | 1.0000 |
| $A_4$ | = | $-0.69516 \pm 10^{-5}$ |
| $A_6$ | = | $-0.37838 \pm 10^{-7}$ |
| $A_8$ | = | $0.18367 \pm 10^{-9}$ |
| $A_{10}$ | = | $-0.15531 \pm 10^{-11}$ |

25th surface

| | | |
|---|---|---|
| P | = | 1.0000 |
| $A_4$ | = | $0.79001 \pm 10^{-5}$ |
| $A_6$ | = | $0.17288 \pm 10^{-7}$ |
| $A_8$ | = | $-0.75567 \pm 10^{-10}$ |
| $A_{10}$ | = | $0.52462 \pm 10^{-12}$ |

Example 4

$f = 28.8 \sim 54. \sim 101.9$
$F_{NO} = 4.6 \sim 6.1 \sim 8.0$
$2\omega = 73.74 \sim 43.46 \sim 23.94°$ -continued $f_B = 4.5 \sim 23.7 \sim 50.4$
$\beta_3 = 1.10 \sim 1.19 \sim 1.24$
$\beta_4 = 1.20 \sim 1.86 \sim 2.78$

| | | | | | | | | |
|---|---|---|---|---|---|---|---|---|
| $r_1$ | = | −104.8750 | $d_1$ | = | 2.000 | $n_{d1}$ = 1.83400 | $\nu_{d1}$ = | 37.16 |
| $r_2$ | = | 37.2890 | $d_2$ | = | 5.000 | $n_{d2}$ = 1.51742 | $\nu_{d2}$ = | 52.41 |
| $r_3$ | = | −81.2180 | $d_3$ | = | 0.200 | | | |
| $r_4$ | = | 36.4760 | $d_4$ | = | 4.500 | $n_{d3}$ = 1.58904 | $\nu_{d3}$ = | 53.20 |
| $r_5$ | = | −143.1600 | $d_5$ | = | (Variable) | | | |
| $r_6$ | = | −30.7210 | $d_6$ | = | 1.000 | $n_{d4}$ = 1.77250 | $\nu_{d4}$ = | 49.66 |
| $r_7$ | = | 12.8240 | $d_7$ | = | 0.790 | | | |
| $r_8$ | = | 17.3610 | $d_8$ | = | 3.000 | $n_{d5}$ = 1.78472 | $\nu_{d5}$ = | 25.68 |
| $r_9$ | = | −92.8180 | $d_9$ | = | 1.500 | | | |
| $r_{10}$ | = | ∞ (Stop) | $d_{10}$ | = | 2.500 | | | |
| $r_{11}$ | = | 41.2990 | $d_{11}$ | = | 3.880 | $n_{d6}$ = 1.51633 | $\nu_{d6}$ = | 64.15 |
| $r_{12}$ | = | −24.7180 (Aspheric) | $d_{12}$ | = | 0.750 | | | |
| $r_{13}$ | = | −30.9670 | $d_{13}$ | = | 1.200 | $n_{d7}$ = 1.80518 | $\nu_{d7}$ = | 25.43 |
| $r_{14}$ | = | 21.6900 | $d_{14}$ | = | 5.200 | $n_{d8}$ = 1.69680 | $\nu_{d8}$ = | 55.52 |
| $r_{15}$ | = | −14.2150 | $d_{15}$ | = | (Variable) | | | |
| $r_{16}$ | = | −52.4040 | $d_{16}$ | = | 3.500 | $n_{d9}$ = 1.78472 | $\nu_{d9}$ = | 25.68 |
| $r_{17}$ | = | 19.5360 | $d_{17}$ | = | 1.250 | | | |
| $r_{18}$ | = | −20.0760 | $d_{18}$ | = | 1.600 | $n_{d10}$ = 1.77250 | $\nu_{10}$ = | 49.66 |
| $r_{19}$ | = | −393.6420 | $d_{19}$ | = | (Variable) | | | |
| $r_{20}$ | = | −18.3260 | $d_{20}$ | = | 2.200 | $n_{d11}$ = 1.72916 | $\nu_{d11}$ = | 54.68 |
| $r_{21}$ | = | −140.0870 | | | | | | |

Zooming Spaces

| f | 28.8 | 54.2 | 101.9 |
|---|---|---|---|
| $d_5$ | 3.7000 | 14.3550 | 28.2020 |
| $d_{15}$ | 13.8190 | 6.4970 | 1.3000 |
| $d_{19}$ | 4.6000 | 4.5840 | 5.0320 |

Aspherical Coefficients

12th surface

| P | = | 1.0000 |
|---|---|---|
| $A_4$ | = | $0.77132 \times 10^{-4}$ |
| $A_6$ | = | $0.33027 \times 10^{-6}$ |
| $A_8$ | = | $-0.24906 \times 10^{-8}$ |
| $A_{10}$ | = | $0.38477 \times 10^{-10}$ |

Figure 8A:
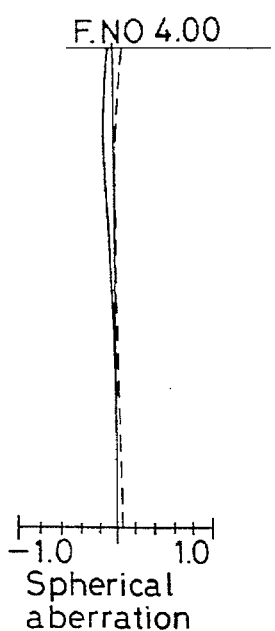
FIG. 8 is an aberration diagram of Example 2 similar to FIG. 7.
Figure 8B:
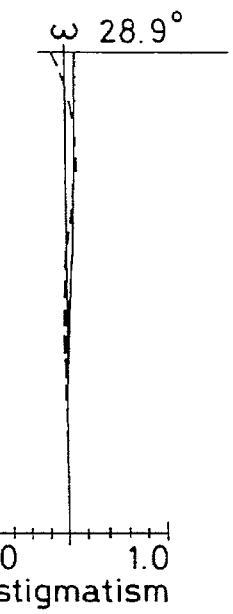
Figure 8C:
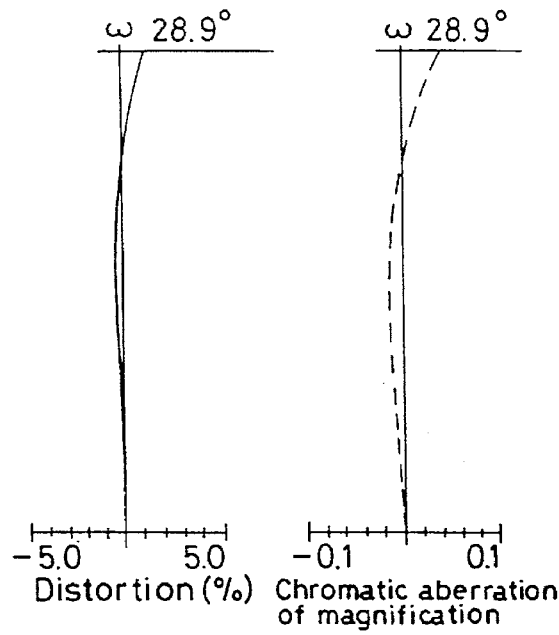
Figure 8D:
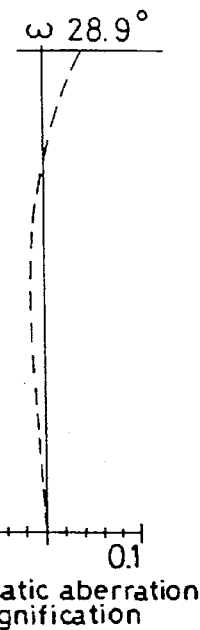
Figure 8E:
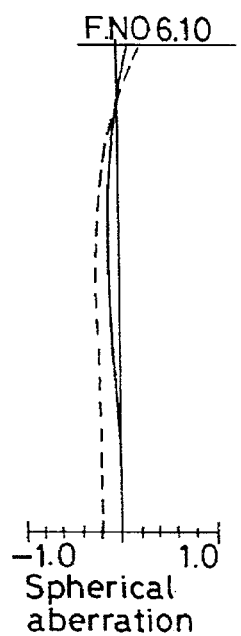
Figure 8F:
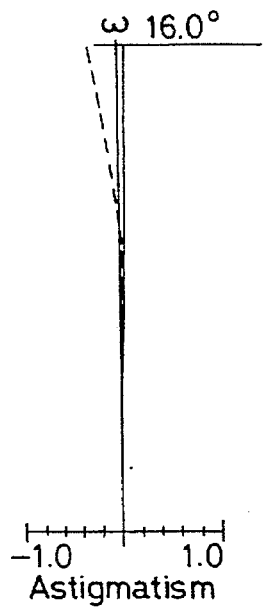
Figure 8G:
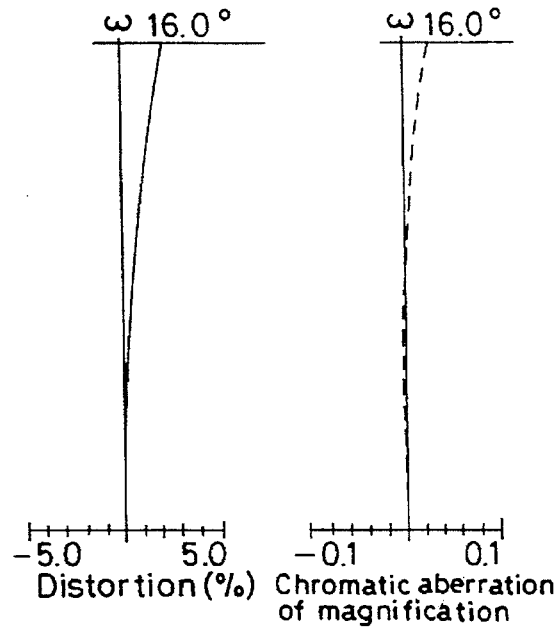
Figure 8H:
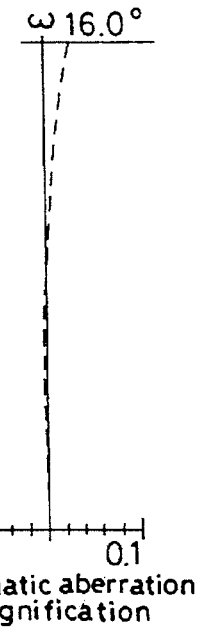
Figure 9A:
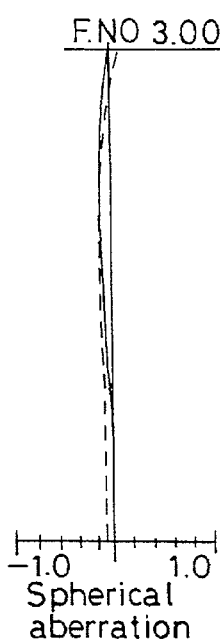
FIG. 9 is an aberration diagram of Example 3 similar to FIG. 7.
Figure 9B:
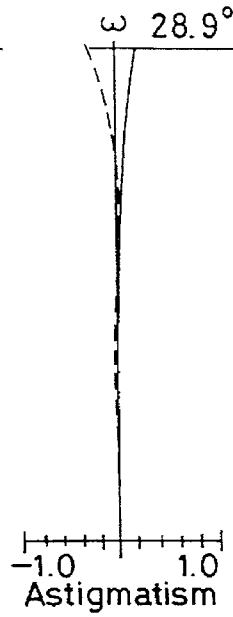
Figures 9C, 9D:
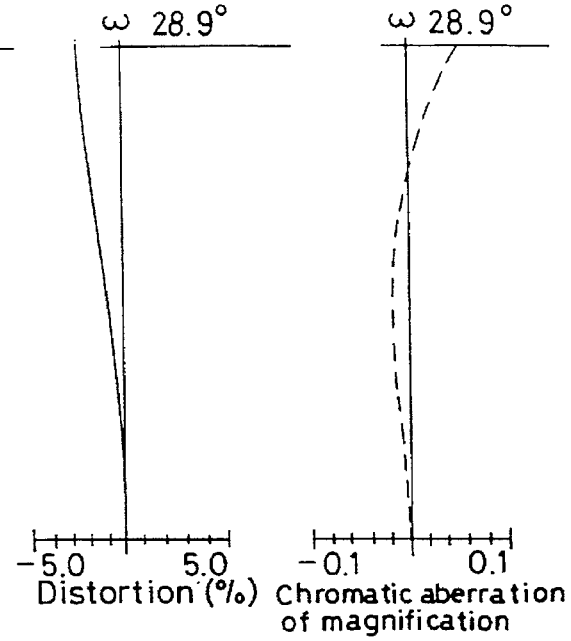
Figure 9E:
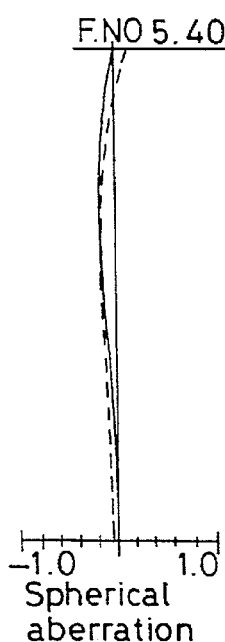
Figure 9F:
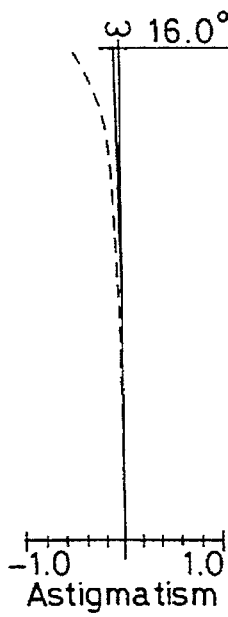
Figures 9G, 9H:
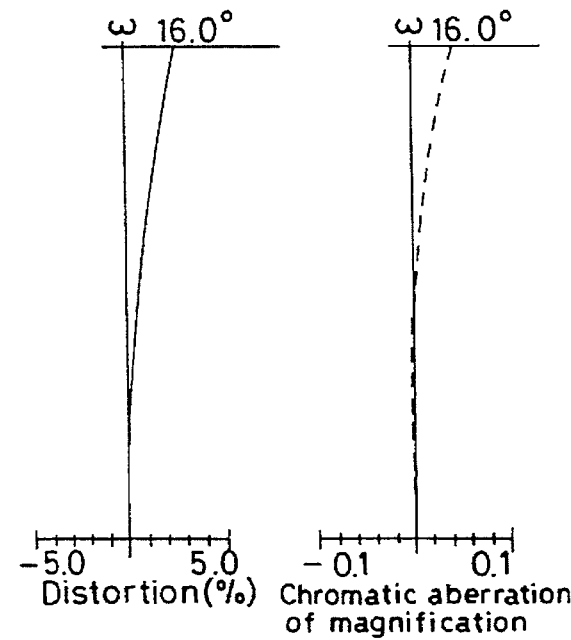

FIGS. 7 to 10 are aberration diagrams showing spherical aberration, astigmatism, distortion, and chromatic aberration of magnification of Examples 1 to 4 with respect to the object point at infinity at the wide-angle end (a), intermediate focal length (b) and telephoto end (c).

Values of Conditional Formulae (1) to (6) in each example are given in the following table, wherein Ri and Y are the lens surface number and the effective radius for calculating $\Delta_P$ and $\Delta_N$, respectively.

TABLE

| | Ex. 1 | Ex. 2 | Ex. 3 | Ex. 4 |
|---|---|---|---|---|
| (1) $|f_{34}|/f_W$ | 0.635 | 0.603 | 0.632 | 0.754 |
| (2) $\beta_{3W}$ | 1.341 | 1.168 | 1.356 | 1.101 |
| (3) $\beta_{4W}$ | 1.080 | 1.191 | 1.066 | 1.204 |
| (4) $\Delta_P/\phi_P$ | 8.445 (R13) | 5.751 (R10) | 2.767 (R18) | 3.353 (R12) |
| | Y = 6.954 | Y = 7.096 | Y = 8.059 | Y = 5.351 |
| (5) $\Delta_N/\phi_N$ | −5.506 (R19) | −4.505 (R18) | 5.244 (R21) | |
| | Y = 10.607 | Y = 11.034 | Y = 10.550 | |
| | | | −11.722 (R25) | |
| | | | Y = 13.257 | |
| (6) $N_N$ | 1.804 | 1.788 | 1.804 | 1.751 |

According to the above arrangement of the invention, it is possible to achieve a four-unit or positive-positive-negative-negative type of zoom lens system which is of compact size albeit having a high zoom ratio.

What we claim is:

1. A four-unit type zoom lens system having a high zoom ratio, consisting essentially of, in order from an object side of an optical axis:
   a first lens unit having positive refracting power,
   a second lens unit having positive refracting power,
   a third lens unit having negative refracting power, and
   a fourth lens unit having negative refracting power;
   wherein said first, second, third, and fourth lens units are all movable toward the object side of the optical axis for zooming from a wide-angle end to a telephoto end of the lens system.

2. A four-unit type of zoom lens system according to claim 1, wherein the space between said first and second lens units becomes wide during said zooming from the wide-angle to telephoto end.

3. A four-unit type of zoom lens system according to claim 1, wherein the magnifications of both said third and fourth lens units increase during said zooming from the wide-angle to telephoto end.

4. A four-unit type of zoom lens system according to claim 1, which conforms to the following condition (1):

$$0.3 < |f_{34}|/f_W < 1.1 \quad (1)$$

where $f_W$ is the focal length of the overall system at the wide-angle end, and $f_{34}$ is the composite focal length of the third and fourth lens units at the wide-angle end.

5. A four-unit type of zoom lens system according to claim 1, which conforms to the following condition (2):

$$1 < \beta_{3W} \quad (2)$$

where $\beta_{3W}$ is the paraxial lateral magnification of the third lens unit at the wide-angle end.

6. A four-unit type of zoom lens system according to claim 1, which conforms to the following condition (3):

$$1 < \beta_{4W} \quad (3)$$

where $\beta_{4W}$ is the paraxial lateral magnification of the fourth lens unit at the wide-angle end.

7. A four-unit type of zoom lens system according to claim 1, wherein said second lens unit has at least one aspheric surface.

8. A four-unit type of zoom lens system according to claim 7, which conforms to the following condition (4):

$$0 < \Delta_p/\phi_p, \phi_p = (n_p - n_p')/r_p \quad (4)$$

where $r_p$ is the paraxial radius of curvature of the aspheric surface, $n_p$ is the refractive index of the medium contiguous to the object side of the aspheric surface, and $n_p'$ is the refractive index of the medium contiguous to the image side of the aspheric surface.

9. A four-unit type of zoom lens system according to claim 1, wherein said third lens unit include at least one aspheric surface.

10. A four-unit type of zoom lens system according to claim 1, wherein said fourth lens unit include at least one aspheric surface.

11. A four-unit type of zoom lens system according to claim 9 or 10, which conforms to the following condition (5):

$$\Delta_N/\phi_N < 0, \phi_N = (n_N - n_N')/r_N \quad (5)$$

where $r_N$ is the paraxial radius of curvature of the aspheric surface, $n_N$ is the refractive index of the medium contiguous to the object side of the aspheric surface, and $n_N'$ is the refractive index of the medium contiguous to the image side of the aspheric surface.

12. A four-unit type of zoom lens system according to claim 1, which conforms to the following condition (6):

$$1.7 < N_N \quad (6)$$

wherein the third and fourth lens units comprise a plurality of lens elements, and wherein $N_N$ is the mean value of the refractive indices of all negative lens elements incorporated in the third and fourth lens units.

13. A four-unit type of zoom lens system according to claim 1, wherein said second lens unit comprises six lens elements and a stop disposed between two of said lens elements.

14. A four-unit type of zoom lens system according to claim 13, wherein the lens surface on the object side with respect to said stop is convex on the image side, and the lens surface on the image side with respect to said stop is convex on the object side.

15. A four-unit type of zoom lens system according to claim 1, wherein the lens surface of said third lens unit proximate to the object side be concave on the object side.

16. A four-unit type zoom lens system having a high zoom ratio, which comprises, in order from an object side of an optical axis:

a first lens unit having positive refracting power, a second lens unit having positive refracting power, a third lens unit having negative refracting power, and a fourth lens unit having negative refracting power; and wherein said first, second, third, and fourth lens units are all movable toward the object side of the optical axis for zooming from a wide-angle end to a telephoto end of the lens system, and wherein a space between said second and third lens units becomes relatively narrower during said zooming from the wide-angle end to the telephoto end.

17. A four-unit type of zoom lens system according to claim 16, wherein the space between said first and second lens units becomes wider during said zooming from the wide-angle end to the telephoto end.

18. A four-unit type of zoom lens system according to claim 16, wherein the magnifications of both said third and fourth lens units increase during said zooming from the wide-angle end to the telephoto end.

19. A four-unit type of zoom lens system according to claim 16, which conforms to the following condition (1):

$$0.3 < |f_{34}|/f_W < 1.1 \quad (1)$$

where $f_W$ is the focal length of the overall system at the wide-angle end, and $f_{34}$ is the composite focal length of the third and fourth lens units at the wide-angle end.

20. A four-unit type of zoom lens system according to claim 16, which conforms to the following condition (2):

$$1 < \beta_{3W} \quad (2)$$

where $\beta_{3W}$ is the paraxial lateral magnification of the third lens unit at the wide-angle end.

21. A four-unit type of zoom lens system according to claim 16, which conforms to the following condition (3):

$$1 < \beta_{4W} \quad (3)$$

where $\beta_{4W}$ is the paraxial lateral magnification of the fourth lens unit at the wide-angle end.

22. A four-unit type of zoom lens system according to claim 16, wherein said second lens unit has at least one aspheric surface.

23. A four-unit type of zoom lens system according to claim 16, wherein said third lens unit includes at least one aspheric surface.

24. A four-unit type of zoom lens system according to claim 16, wherein said fourth lens unit includes at least one aspheric surface.

25. A four-unit type of zoom lens system according to claim 16, which conforms to the following condition (6):

$$1.7 < N_N \quad (6)$$

wherein the third and fourth lens units comprise a plurality of lens elements, and wherein $N_N$ is the mean value of the refractive indices of all negative lens elements incorporated in the third and fourth lens units.

26. A four-unit type of zoom lens system according to claim 16, wherein said second lens unit comprises six lens elements and a stop disposed between two of said lens elements.

27. A four-unit type of zoom lens system according to claim 16, wherein a lens element of said third lens unit closest to the object side of the optical axis is concave on its object side.

28. A four-unit type zoom lens system having a high zoom ratio, which comprises in order rom an object side of an optical axis:

a first lens unit having positive refracting power, a second lens unit having positive refracting power, a third lens unit having negative refracting power, and a fourth lens unit having negative refracting power; wherein said first, second, third and fourth lens units are all movable toward the object side of the optical axis for zooming from a wide-angle end to a telephoto end of the lens system, and wherein a space between said third and fourth lens units becomes relatively wider during zooming from the wide-angle end to the telephoto end of the lens system.

29. A four-unit type of zoom lens system according to claim 28, wherein the space between said first and second lens units becomes wider during said zooming from the wide-angle end to telephoto end.

30. A four-unit type of zoom lens system according to claim 28, wherein the magnifications of both said third and fourth lens units increase during said zooming from the wide-angle end to the telephoto end.

31. A four-unit type of zoom lens system according to claim 28, which conforms to the following condition (1):

$$0.3 < |f_{34}|/f_W < 1.1 \quad (1)$$

where $f_W$ is the focal length of the overall system at the wide-angle end, and $f_{34}$ is the composite focal length of the third and fourth lens units at the wide-angle end.

32. A four-unit type of zoom lens system according to claim 28, which conforms to the following condition (2):

$$1 < \beta_{3W} \quad (2)$$

where $\beta_{3W}$ is the paraxial lateral magnification of the third lens unit at the wide-angle end.

33. A four-unit type of zoom lens system according to claim 28, which conforms to the following condition (3):

$$1 < \beta_{4W} \quad (3)$$

where $\beta_{4W}$ is the paraxial lateral magnification of the fourth lens unit at the wide-angle end.

34. A four-unit type of zoom lens system according to claim 28, wherein said second lens unit has at least one aspheric surface.

35. A four-unit type of zoom lens system according to claim 28, wherein said third lens unit includes at least one aspheric surface.

36. A four-unit type of zoom lens system according to claim 28, wherein said fourth lens unit includes at least one aspheric surface.

37. A four-unit type of zoom lens system according to claim 28, which conforms to the following condition (6):

$$1.7 < N_N \quad (6)$$

wherein the third and fourth lens units comprise a plurality of lens elements, and wherein $N_W$ is the mean value of the refractive indices of all negative lens elements incorporated in the third and fourth lens units.

38. A four-unit type of zoom lens system according to claim 28, wherein said second lens unit comprises six lens elements and a stop disposed between two of said lens elements.

39. A four-unit type of zoom lens system according to claim 28, wherein a lens element of said third lens unit closest to the object side of the optical axis is concave on its object side.

* * * * *